Nov. 20, 1962     VLADIMIR ZE'EV ZAKS     3,065,378
VISUAL DISPLAY AND READOUT SYSTEMS
Filed Oct. 19, 1959
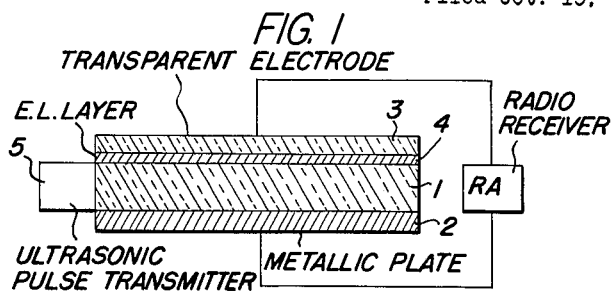
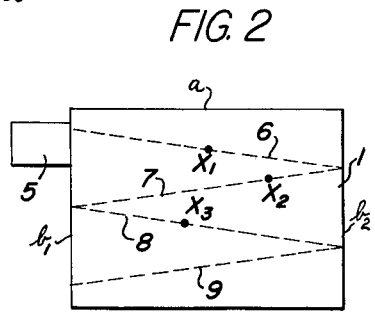
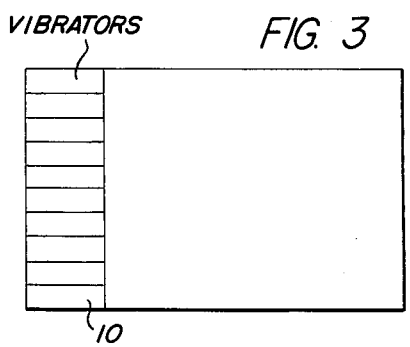
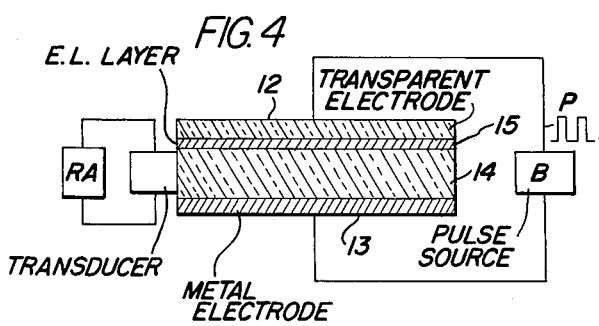
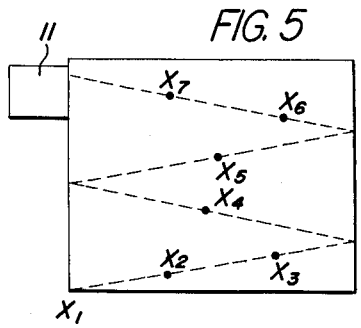
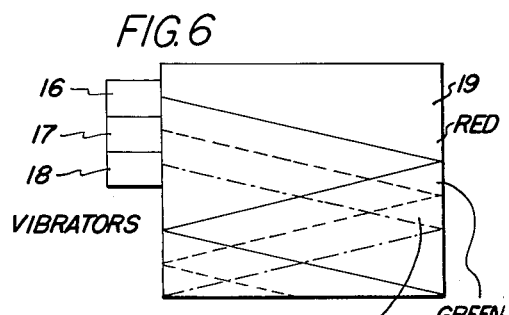
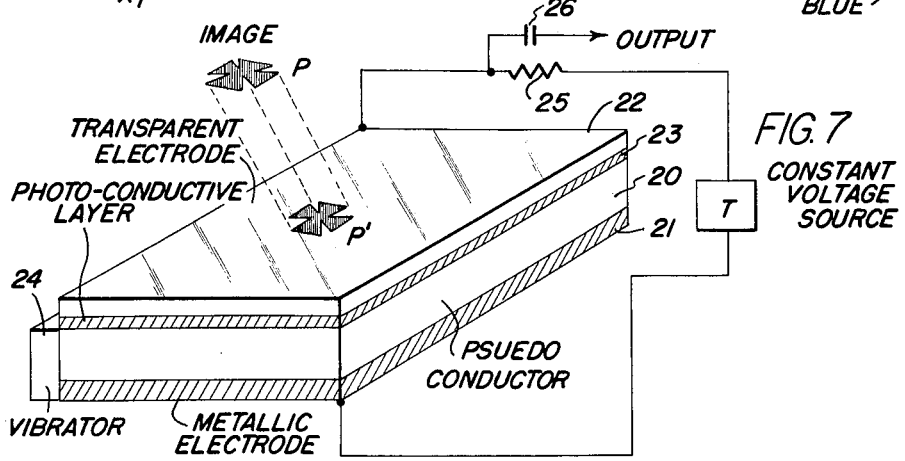

3,065,378
VISUAL DISPLAY AND READOUT SYSTEMS
Vladimir Ze'ev Zaks, Kiryat Chaim, Israel, assignor of one-half to The American Society for Technion, Israel Institute of Technology, Inc., New York, N.Y., a corporation of New York
Filed Oct. 19, 1959, Ser. No. 847,161
15 Claims. (Cl. 315—55)

The present invention relates generally to visual display and readout systems, and more particularly to systems for providing visual displays, which may replace vacuum tube displays, and which operate to provide displays in response to mechanical excitation, and to systems for reading out a pattern of light excitation in terms of electric currents.

More particularly, the invention has as its object to provide novel pickup and reproduction screens useful in the fields of television, radar and the like visual displays and readouts.

Up to now, cathode-ray type tubes have been used for all the above recited purposes. Their main disadvantages are that they require a high vacuum in their interior, that they are expensive and difficult to manufacture and are in addition comparatively bulky. It is, therefore, an object of the present invention to provide devices which can replace cathode-ray type tubes in their aforesaid and similar applications and are simple to manufacture, require simple receivers and comparatively little space.

The invention is based on the observation that some substances which are ordinarily electrical insulators, become conductors when submitted to vibrations. For example, when a plate made of such a substance is disposed between two charged electrodes no current will be transmitted through it. When, however, a given spot on this plate is at a given moment subjected to vibration the plate becomes conductive at this spot at that very moment, whereas it remains an insulator at the same moment in all other parts. These substances will be referred to hereinafter as "pseudo-conductors." There exist solid, liquid as well as gaseous pseudo-conductors. If a liquid or gaseous pseudo-conductor is used for the purposes of the present invention, it may be enclosed in a casing whose faces disposed opposite the electrodes are of electrically conducting material, whereas its side-walls are of insulating material, whereby it is possible that the electrodes serve as top and bottom of such a casing.

In the present specification, the term "spot" means not only a point on the surface of the pseudo-conductor plate but also the line extending from that point through the plate to the registering point of the opposite surface. Similarly, a "spot" in connection with a liquid or gaseous pseudo-conductor means a line extending between two registering point of opposite faces of the container.

The invention consists in a method of producing current discharges in a controlled sequence, comprising applying electrodes to opposite faces of a pseudo-conductor element (as herein defined), applying voltage across the electrodes, and producing controlled, directed vibrations progressing through the element substantially parallel to the electrodes, thereby allowing current to pass at any given moment through the element at the points where vibrations occur at that moment.

The invention also consists in current-impulse producing devices comprising a pseudo-conductor element; electrode plates applied to opposite faces of the element; and means disposed at least at one edge and/or face of the element for setting up controlled directed vibrations in the element progressing through it substantially parallel to the electrodes.

In many cases it will be sufficient if there are applied to two opposite faces of the pseudo-conductor two electrode plates. However, in some cases it may be preferred to replace one of the electrode plates by a plurality of small electrode plates connected each to its own source of potential.

In accordance with the present invention, the vibrations imparted to the pseudo-conductor plate are sonic or ultrasonic vibrations produced, for example, by one or more piezoelectric crystal vibrators applied to one or more edges and/or faces of the pseudo-conductor. It should, however, be understood that instead of piezoelectric crystals, other known electric-mechanical transducers can be used.

The shocks or vibrations produced by the piezoelectric crystals at a given edge may be absorbed at another edge, e.g., the opposite one, when reaching it for the first time, or they may, alternatively, be reflected several times at the edges, thus describing for example a zig-zag-like path between them. However, even in the latter case, the energy of one single shock-wave or vibration may be insufficient for sweeping the entire plate. Or, even when the energy is sufficient, the time lag between the beginning and the termination of the vibration path will be too large for practical purposes. Therefore, in many cases, a number of shock-waves or vibrations will have to be imparted to the pseudo-conductor at different places, either simultaneously or in succession, in order to achieve a complete sweep within reasonable time.

According to one embodiment of the invention the said device is designed as a television pickup for scanning objects, pictures, graphs or the like, all of which are called herein for short, "images." In this case one of the electrodes is transparent, a photoconductive layer is interposed between the transparent electrode and pseudo-conductor, a constant potential for example of the order of 100–300 volts is applied to the electrodes, and the image to be transmitted is made to face the transparent electrode and the photoconductive layer. The spots where currents are produced are those where light emanating from the image impinges on the photoconductive layer and at the same time a vibration occurs. The migration of the vibrations produces successive electric current impulses whose intensities vary with the intensities of the light received from the image, and these are fed to a transmitted, or a type known per se, such as a television receiver.

According to a further embodiment of the invention, the device is designed as an image reproduction screen, such as a television screen, radar screen, oscilloscope, or the like. In this case, an electroluminescent layer is interposed between the transparent electrode and the pseudo-conductor plate and a modulated potential, being for example the output of a television receiver set and having for example a peak value of 100–300 volts, is applied to the two electrode plates. The current impulses produced successively at each spot along the path of progression of the vibrations as these pass through that spot, have varying intensities dependent on the magnitude of the modulated potential at that moment. The current impulses are made visible by scintillations of the electroluminescent layer.

A similar embodiment may be used for the electric control of working processes. In this case the transparent electrode will be replaced by a plurality of small electrode plates each of which lead via a different working part or apparatus to its source of potential. Each such electrode will receive a current impulse at the moment when the registering spot of the pseudo-conductor plate becomes conductive due to vibration and each current impulse thus produced will actuate the operating part or apparatus to which it is connected.

According to a specific embodiment of the invention:
A pseudo-conductor plate is sandwiched between two electrode plates at least one of which is transparent and an electroluminescent layer is interposed between the transparent electrode and the pseudo-conductor plate. A pulsating potential of constant pulse-duration, pulse-repetition frequency and amplitude is applied to the electrodes whereas a modulated potential, being for example the output of a television receiver set, a radar receiver, or the like, is applied to the vibration-producing piezoelectric crystals, whose own vibrations, and accordingly those imparted to the pseudo-conductor, vary in frequency and/or amplitude in dependence on the modulations impressed on the voltage.

By the time the first vibration has completed its path across the pseudo-conductor, many more successive vibrations have been produced in its wake, and the entire path is crowded with discrete energy waves whose individual intensities and intervals from one another are a direct function of the modulations of the potential applied to the piezoelectric crystal or crystals. The pulsations of the potential applied to the electrodes are so timed that the first pulse occurs at the moment when the first vibration has reached the end of its path. As a result, distinct current impulses of different intensities pass simultaneously through different spots disposed along the path of the vibrations. These may again be made visible on an electroluminescent layer.

In certain embodiments of the invention the vibrations imparted to the pseudo-conductor are in the form of periodic shocks which should have a pulse repetition frequency of 15–60 cycles per second, and they should preferably be of a very short duration, e.g. 0.1–1 $\mu sec$. Periodic shocks of this kind are produced by applying to the piezoelectric crystals periodically recurrent pulses of a pulsating high frequency potential whose peak value is of the order of 100–600 volts, the frequency of pulse-repetition being about 15–60 cycles per second, and the frequency of the potential itself of 10–100 megacycles per second. The piezoelectric crystals are brought into close contact with the edges of the pseudo-conductor so that each shock wave is separately transmitted to it.

In a further embodiment of the invention the carrier frequency of the voltage applied to the piezoelectric crystals is 10–100 megacycles, and this undergoes frequency and/or amplitude modulations.

Solid pseudo-conductors suitable for the purposes of this invention are, for example, materials containing as main components one or more elements or oxides of elements of the 3rd, 4th or 5th group of the periodic system, fused together with impurities whose nature and realtive proportions will have to be determined experimentally in each particular case.

A particularly useful composition is the following:

|  | Percent |
|---|---|
| $SiO_2$ | 74 |
| $Al_2O_3$ | 0.44 |
| $TiO_2$ | 0.04 |
| CaO | 6.19 |
| MgO | 0.23 |
| $Na_2O$ | 18.88 |
| $K_2O$ | 0.22 |

The components are fused together and the composition obtained is in the nature of glass.

Examples of liquid pseudo-conductors are glycerol and nitrobenzene while as gaseous pseudo-conductors neon and argon may be mentioned.

Especially suitable are those pseudo-conductors in which vibrations propagate at a velocity of about 0.6–6 km./sec.

Transparent electrodes are known. For example, a $SnO_2$ film or a glass pane coated with $TiO_2$ may be used.

Electroluminescent layers suitable for use where an optical pattern has to be reproduced visually, may be made, for example, from a ZnS film. Instead, it is also possible to use such pseudo-conductors which are also electroluminescent at the same time. For example, a composite body of the nature specified above, containing as an additional component ZnS, can be used.

The invention is illustrated, by way of example only, in the accompanying drawings in which:

FIGURE 1 is a diagrammatic cross-section of a device for visual reproduction according to a first embodiment of the invention;

FIGURE 2 is a diagrammatic plan view of the pseudo-conductor of FIGURE 1;

FIGURE 3 is a plan view of a further embodiment of my invention, employing multiple transducers;

FIGURE 4 is a diagrammatic cross-section through a device according to a further embodiment of the invention;

FIGURE 5 is a diagrammatic plan view of a pseudo-conductor plate of the system of FIGURE 4;

FIGURE 6 is a diagrammatic plan view of an image display for color reproduction;

FIGURE 7 is a diagrammatic perspective view of and image scanning or pickup device according to the invention.

The image reproducer according to FIGURES 1 and 2 comprises a pseudo-conductor plate 1 and a metal electrode 2 and a transparent electrode 3 closely bearing against opposite faces of plate 1, with the interposition between plate 1 and electrode 3 of an electroluminescent layer 4. Across electrodes 2, 3, a varying potential is applied corresponding to the modulation impressed on a carrier frequency, e.g., the output of a receiving amplifying unit RA. Closely bearing against the edge of plate 1 is a vibrator 5 producing periodic shocks. This is constituted by a piezoelectric crystal provided with means for applying to it a succession of pulses of high frequency potential of 100–600 volts, with a pulse-repetition frequency of about 15–60 cycles and a pulse carrier frequency of 10–100 megacycles.

The operation of a television screen according to the invention will now be explained by reference to FIGURE 2. As already stated above, the main feature of the pseudo-conductor is its being an electrical insulator turning into a conductor when subjected to vibration. Therefore, if a permanent constant voltage were applied to the two electrodes (FIG. 1) while the pseudo-conductor plate is not subjected to vibration, no current would flow between the two electrodes. If now a single shock is imparted to the plate by the vibrator 5 at the time $t_0$ in a direction somewhat oblique relative to the normal to the edge $a$ of the plate the vibration thereby produced will propagate as a shock wave along a path zigzagging in sweeps across the plate 1 as indicated by dotted lines 6, 7, 8, 9 in FIGURE 2, being reflected at either edge $b_1$, $b_2$ towards the opposite edge. This means that each spot of the plate 1 in this path undergoes vibration for one brief moment while the shock wave passes through it. Accordingly, current flows between the electrodes through plate 1 at each such spot in the given time, say at the time $t_1$ in the spot $X_1$, at the time $t_2$ at $X_2$, at the time $t_3$ at $X_3$ and so forth. When the shock wave has completed its path, current impulses will have passed through the plate 1 at all the spots of the path of the shock wave in succession. Each such impulse excites the electroluminescent layer 4 at the corresponding point, and produces a scintillation. Since, however, the progression speed of the shock wave is very high the time lag between the first and last scintillations is smaller than the minimum time interval required by the human eye for discerning discrete light phenomena, and the entire path of the shock wave appears uniformly and simultaneously illuminated on the luminescent screen.

If now the voltage applied to the electrodes is not constant but varies, such as, for example, a modulated high frequency voltage, like the output of a television receiver, RA, the applied voltage may vary from impulse to impulse, and the intensity of the impulses varies accordingly from spot to spot along the path of the shock wave. The light intensities will then be different at different spots on the electroluminescent layer, and the impression conveyed thereby to the eye will be that of an image.

It is known that for television pickup and reproducing screens the scanning line frequency at both the transmitting and receiving ends must be about 500 horizontal lines per 1/30 second. It has now been found that in some cases, depending on the size and material of the plate, a shock wave progressing across the pseudo-conductor fades out after a certain time, say e.g. about 50 sweeps. Accordingly, at the end of the 50th sweep of the shock wave produced by the first vibrator, a second vibrator has to be provided at the edge of the plate, and this produces a new shock wave extending over another 50 sweeps. For sweeping the entire plate it will thus be required to dispose ten vibrators at the plate. These are either so synchronized that each vibrator starts operating when the shock wave originating from the preceding vibrator has run out, or else they are designed to operate simultaneously.

An arrangement comprising several vibrators is diagrammatically illustrated in FIGURE 3, which shows a screen similar to that illustrated in FIGURE 2, having vibrators 10 aligned along its left-hand edge. Instead of disposing all the vibrators at one edge, they may be distributed along two or even all four edges.

In the embodiment according to FIGURES 4 and 5, the output voltage of a receiving-amplifying unit RA is fed to the vibrator 11 which is a piezoelectric crystal whose vibrations are excited by said output voltage and vary with the variations of frequency and/or amplitude impressed on the carrier frequency thereof. The transparent electrode 12 and metal electrode 13 are connected to a source B of periodic potential pulses P of constant pulse-duration, repetition frequency and amplitude. Between the transparent electrode 12 and the pseudo-conductor plate 14 an electroluminescent layer 15 is interposed.

At a given moment a vibration is produced by the vibrator 11 and propagates in the plate 14 along a zigzagging path as described in connection with FIGURE 2. While this first vibration proceeds on its path, a second vibration of the same or a different frequency and/or amplitude is produced by the vibrator and follows in plate 14 in the wake of the first vibration. The same then happens with a third vibration, and so forth, the rhythm of the variations and their amplitudes being determined by the modulation of the voltage applied by the receiving-amplifying device RA. At the beginning, no potential is applied to the electrodes 12, 13, while the successive vibrations are being produced. Only after a given time $t_n$, not before the first vibration has swept out its path back and forth across the pseudo-conductor plate 14 and has reached the spot $X_1$, at which moment the vibrations produced subsequently have reached different spots $X_2$, $X_3$, etc. along the same path, an electric potential of the order of 100–600 volts and of very short duration is supplied by the source B to the electrodes. At this moment the pseudo-conductor is conductive along the entire path owing to the successive vibrations, either pointwise or in a virtually continual stretch. To the extent that the vibrations differ from one another in frequency and/or amplitude the conductivity differs from spot to spot, and a plurality of current impulses of different intensities pass simultaneously through the plate 14. When this has happened the potential applied to plates 12, 13 drops to zero, a new set of vibrations is produced by the vibrator 11, then another voltage pulse is applied to the electrodes, and so forth.

This embodiment of the invention can be used for color television, as shown diagrammatically in FIGURE 6. The receiver or transmitter device here illustrated has three vibrators 16, 17, 18 disposed at one edge of the pseudo-conductor plate 19. These are designed for simultaneous operation and so located relative to the plate that the paths of the vibrations produced by them, through crossing each other, do not overlap. It is then possible to arrange on the pseudo-conductor plate 19 a pattern of three electroluminescent layers luminescing, respectively, in red, green and blue, lying each in the path of the vibrations produced by one of the vibrators. The red vibration path has been indicated by a full line, the blue one by a dash-dotted line, and the green one by a dotted one. The excitation of the electroluminescent layer in each path proceeds by successive series of simultaneous current impulses as described with reference to FIGURES 4 and 5. The three different color paths are disposed so closely together that they cannot be resolved by the human eye. The result is a color reproduction in which the different colors and color shades are achieved through variation of the relative intensities of the three color components in the known manner.

FIGURE 7 illustrates in a diagrammatic manner an image readout according to the present invention. This comprises a pseudo-conductor plate 20, a metal electrode 21, a transparent electrode 22 and a photoconductive layer 23 interposed between electrode 22 and plate 20. Along one edge of the plate 20 a group of vibrators generally indicated by the numeral 24 is disposed. The vibrators are excited by an alternating voltage of constant amplitude and frequency. A source T supplies a constant voltage to the electrodes.

As long as no light is received on the photo-conductive layer, the latter is not conductive and no current passes between the electrodes 22 and 21 even when the vibrators 24 are operating. If now the photo-conductive layer 23 is lighted uniformly over its entire surface the current impulses passing successively through the vibrating spots of the plate 20 have equal intensities.

If, however, an image P is projected, while the vibrators 24 operate, on the photoconductive layer and there produces a pattern P', the photoconductive layer 23 becomes conductive. The conductivity varies from spot to spot in accordance with the light intensities of the projected pattern P', and so do accordingly the intensities of the successive current impulses. This pattern of successive current impulses can be transmitted in the known manner to the receiver, where it is transformed into a reproduction of the pattern P' owning to the synchronization of the line scanning with that of the pickup. Output voltages may be derived by providing a resistance 25 in series with voltage source T, and connecting a D.C. isolating condenser 26 at the junction of electrode 22 and resistance 25, through which may be derived voltage pulses due to variations of current flow from source T, caused by the scanning vibrations, when these scan under the image P'.

This pickup can also be used for color transmission, e.g. by the simultaneous operation of three separate pickups receiving, respectively, the red, green and blue components of the image.

It should be noted that the zig-zag path described above in connection with the scanning was given by way of example only and that any other path may be applied, provided that a complete sweeping of the screen is achieved.

The pickup screens according to the invention need not necessarily be flat. They may be curved and, for example, form part of the wall of a vessel or pipe and enable observation of processes going on in the interior thereof. Such an arrangement can be of great importance in the control of industrial processes.

The synchronization of scanning required for the scanning in the transmitter and receiver is achieved in the method and devices according to the present invention by synchronizing the vibrators of the transmitters with those of the receiver in accordance with known techniques.

If desired, it is possible in accordance with the present invention to bring the pseudo-conductor and/or the electroluminescent layer in to excited state and thereby to influence the performance of the pickup or reproducing screen, as the case may be. Such excitation can be achieved by irradiation from the outside, e.g. by means of X-rays, ultraviolet or visible radiation, β-radiation or the like.

While I have described and illustrated several specific embodiments of my invention, it will be clear that variations of the details of construction which are specifically illustrated and described may be resorted to without departing from the true spirit and scope of the invention as defined in the appended claims.

What I claim is:

1. A system of producing current discharges in a controlled sequence, comprising electrodes applied to opposite faces of a normally non-conductive pseudo-conductor element arranged and adapted to become conductive only under the influence of mechanical vibration, means for applying voltage across the electrodes, and means for producing short controlled directed vibration pulses progressing through the element substantially parallel to the electrodes, thereby allowing current to pass at any given moment through the element at the points where vibrations occur at the moment due to pseudo-conductivity.

2. A system according to claim 1, wherein the vibrations are generated at one edge of said pseudo-conductor element and directed obliquely through the latter so as to be reflected at at least one other edge of the element, said other edge being reflective of said vibrations, whereby said vibrations proceed in a zig-zagging path.

3. A system according to claim 1, wherein the means for producing vibrations is a single vibrator.

4. A system according to claim 1 wherein the means for producing vibrations is a plurality of vibrators.

5. A system of producing current discharges in a controlled sequence, comprising electrodes applied to opposite faces of a normally non-conductive pseudo-conductor element arranged and adapted to become conductive only under the influence of mechanical vibration, means for applying voltage across the electrodes, and means for producing controlled directed vibrations progressing through the element substantially parallel to the electrodes, thereby allowing current to pass at any given moment through the element at the points where vibrations occur at the moment, a system adapted for use in connection with a signal receiver, wherein at least one of said electrodes is transparent, a photoconductive layer inserted between the transparent electrode and the pseudo-conductor element, a source of constant potential applied to the electrodes, a source of controlled and directed vibrations, means for applying said vibrations to said pseudo-conductor element and directing said vibrators in such manner that they ultimately sweep the entire element, so that light impinging on the photoconductive layer triggers a plurality of successive current discharges whose intensities are dependent on the intensity of the light impinging on each spot of said layer.

6. A system according to claim 1, adapted for use in connection with a visual display, wherein at least one of said electrodes is transparent, an electroluminescent layer inserted between the transparent electrode and the pseudo-conductor element, a source of modulated potential applied to the electrode plates, a source of controlled and directed periodic shock waves imparted to the pseudo-conductor element, wherein the shock waves are so directed as ultimately to sweep the entire element, whereby successive current discharges are produced between the electrodes, the intensities of which discharges depend on the magnitude of the modulated potential at the moment of discharge, and which discharges produce scintillations of the electroluminescent layer.

7. A system according to claim 1, wherein at least one of said electrodes is transparent, an electroluminescent layer inserted between the transparent electrode and the pseudo-conductor element, a source of regularly pulsating potential of constant pulse duration, a pulse repetition frequency and pulse amplitude applied to the electrodes, at least one piezoelectric crystal applied to at least one edge of the pseudo-conductor, and a source of modulated potential applied to the at least one piezoelectric crystal, whereby a plurality of simultaneous current discharges is produced which appear as scintillations of the electroluminescent layer.

8. A system according to claim 7, wherein plural electroluminescent layers luminescining in different colors are disposed in juxtaposition in alternating narrow strips or patches between the transparent electrode and the pseudo-conductor element, each luminescent layer being operatively associated with at least one piezoelectric crystal, means exciting the crystals simultaneously by respective information pertaining to different colors, the different luminescent layers being located so close to one another, and the respective piezoelectric crystals being so disposed relative to one another, that the luminescences in the different colors appear so closely to one another that they cannot be resolved by the human eye.

9. A device comprising a pseudo-conductive thin plate element of great area having reduced resistance in the direction of its thickness in the presence of vibration, electrode plates of great area applied to opposite faces of the element and means disposed at least in contact with an edge of the element for setting up controlled directed vibrations in the element progressing through it substantially parallel to the electrodes.

10. A device according to claim 9, comprising an electroluminescent layer disposed between a transparent electrode and said pseudo-conductor element.

11. A device comprising an element having reduced resistance in the presence of vibration, electrode plates applied to opposite faces of the element and means disposed at least in contact with the element for setting up controlled directed vibrations in the element progressing through it substantially parallel to the electrodes, a device comprising a photoconductive layer disposed between said transparent electrode and said element.

12. A device comprising an element having reduced resistance in the presence of vibration, electrode plates applied to opposite faces of the element and means disposed at least in contact with the element for setting up controlled directed vibrations in the element progressing through it substantially parallel to the electrodes, a device wherein at least one of said electrodes is transparent, a source of a constant direct potential, a photoconductive layer disposed between the transparent electrode and the element, at least one piezoelectric crystal applied to at least one edge of said element and means for exciting said at least one crystal by a regularly pulsating, high frequency potential.

13. A system according to claim 9, wherein at least one of said electrodes is transparent, an electroluminescent layer disposed between the transparent electrode and the element, and one or more piezoelectric crystals applied to at least one edge of the element.

14. A device according to claim 13, wherein is provided means for exciting the at least one piezoelectric crystal by a regularly pulsating, high frequency potential.

15. A system according to claim 14, wherein a source of image representative signals is coupled to the piezoelectric crystals, and wherein is provided a source of regularly pulsating potentials connected to said electrodes.

References Cited in the file of this patent

UNITED STATES PATENTS

| | | |
|---|---|---|
| 2,774,813 | Livingston | Dec. 18, 1956 |
| 2,816,236 | Rosen | Dec. 10, 1957 |
| 2,917,669 | Yando | Dec. 15, 1959 |
| 2,922,923 | Yando | Jan. 26, 1960 |
| 2,951,168 | Yando | Aug. 30, 1960 |
| 2,955,231 | Aiken | Oct. 4, 1960 |